United States Patent [19]

Kleitz et al.

[11] 3,997,962
[45] Dec. 21, 1976

[54] METHOD AND TOOL FOR REMOVING TURBINE FROM GAS TURBINE TWIN SPOOL ENGINE

[75] Inventors: Kenneth S. Kleitz, Rocky Hill; Loren H. White, East Hartford, both of Conn.

[73] Assignee: United Technologies Corporation, Hartford, Conn.

[22] Filed: June 6, 1975

[21] Appl. No.: 584,547

[52] U.S. Cl. ............................ 29/427; 29/200 D; 29/240; 29/401 R; 29/401 F
[51] Int. Cl.² ........................................ B23P 19/02
[58] Field of Search ....... 29/427, 156.8 R, 156.4 R, 29/426, 200 D, 200 H, 240, 270, 280, 401 R, 401 F; 417/360

[56] References Cited
UNITED STATES PATENTS

| | | | |
|---|---|---|---|
| 1,382,838 | 6/1921 | Koch | 29/240 X |
| 1,408,614 | 3/1922 | Linn | 29/280 |
| 2,434,660 | 1/1948 | Knight | 29/270 |
| 2,852,652 | 9/1958 | Rose et al. | 29/240 X |
| 3,033,597 | 5/1962 | Miller | 29/427 X |
| 3,722,058 | 3/1973 | Corsmeier | 29/200 D |

*Primary Examiner*—Victor A. DiPalma
*Attorney, Agent, or Firm*—Norman Friedland

[57] ABSTRACT

Means are provided to remove the high turbine rotor in a twin spool gas turbine engine without requiring a major disassembly of the entire engine particularly where the low shaft is "bottled" so that it cannot be removed axially from the engine, which means includes a tool adapted to fit between the narrow annular space between the shafts to torsionally couple the low rotor shaft and high rotor coupling nut, such that torquing the low rotor shaft uncouples the high turbine rotor.

8 Claims, 3 Drawing Figures

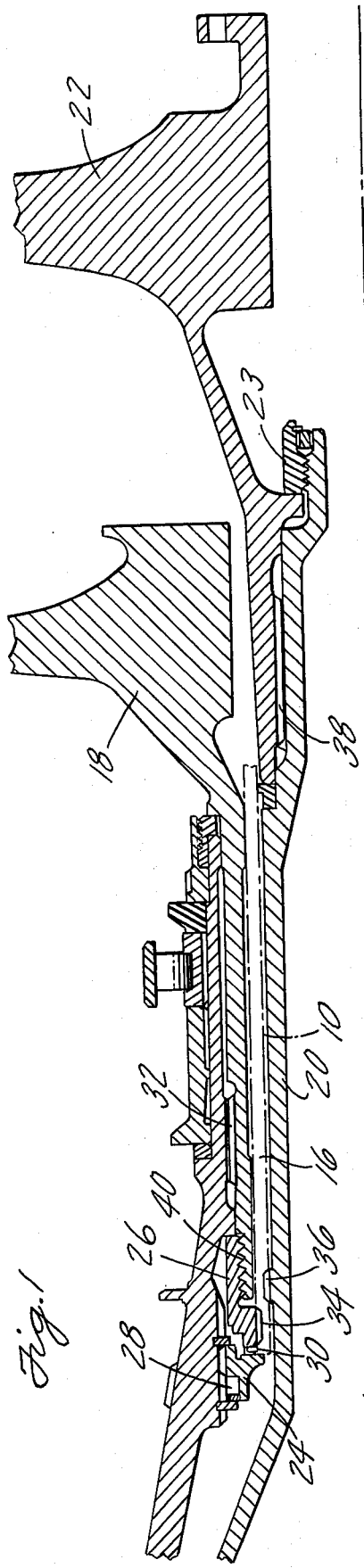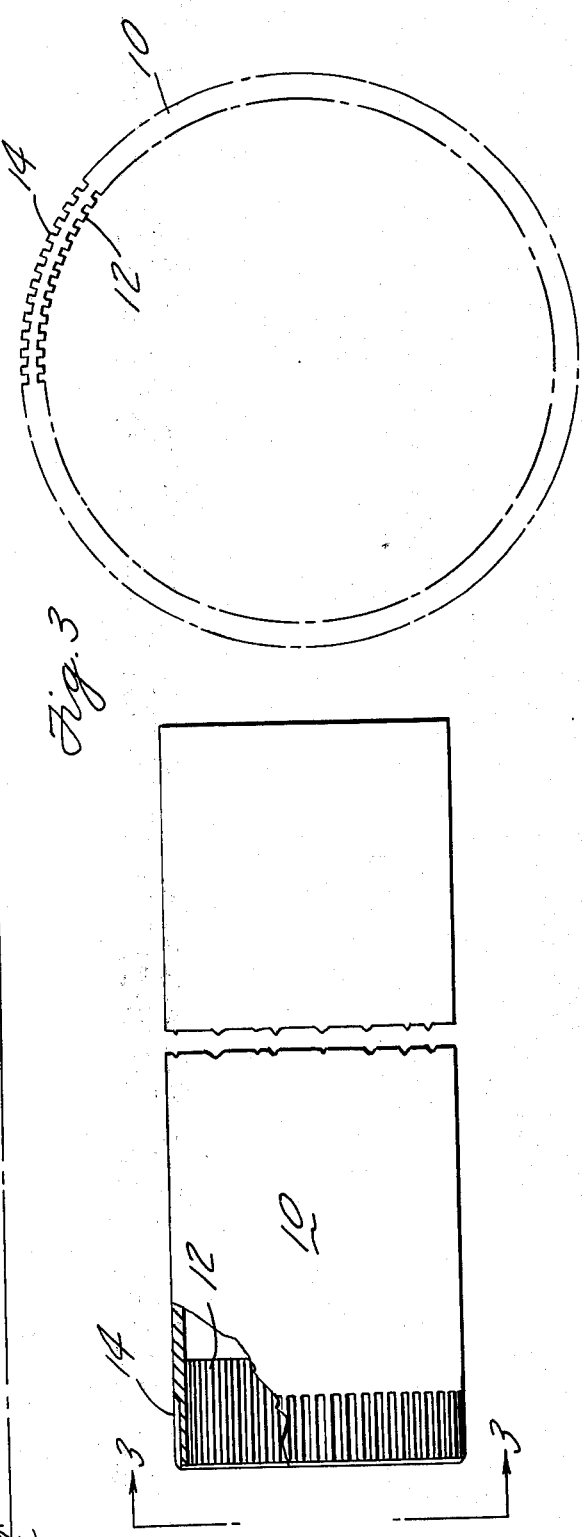

METHOD AND TOOL FOR REMOVING TURBINE FROM GAS TURBINE TWIN SPOOL ENGINE

BACKGROUND OF THE INVENTION

This invention relates to twin spool gas turbine engines and particularly to means for disassembling the high turbine rotor without a major disassembly of the engine.

Two conflicting design features of a high speed twin spool gas turbine engine have contributed to the problem of the removal of the high turbine rotor without requiring a major disassembly of the engine. The first of these features is the fact that in order to obtain the required critical speed of the low shaft it was necessary to increase its diameter in the region of the high compressor section. This "bottled" low shaft, then could not be removed from either end of the engine without high compressor disassembly inasmuch as the diameter of the low shaft is larger than the inner diameter of certain major engine components. Additionally, the high speed shafting features an internal coupling which joins the compressor and turbine rotor with overlapping hubs. The overlap serves to preclude turbine overspeed resulting from shaft torsional failure resulting from an overheated bearing.

We have found that we can remove the high turbine rotor without a major disassembly while incorporating the design features enumerated in the above. In accordance with this invention we provide a thin-wall tool adapted to fit between the small annular space between the high and low shafts which engages an internal spline provided on the high coupling nut. To obviate the problem occasioned by the low torsional buckling strength of the tool, we provide an additional set of spline teeth on the tool that engage external spline teeth provided on the low shaft. Hence, this tool serves to torsionally connect both shafts permitting the operator to rotate the low speed shaft so as to unscrew the high coupling nut to disconnect the high turbine without removing the low shaft.

SUMMARY OF THE INVENTION

An object of this invention is to provide improved means for removing the turbine rotor without a major disassembly of a twin spool gas turbine engine.

A still further object of this invention is to provide in a twin spool gas turbine engine tool means adapted to be inserted between both the high and low shafts to torsionally connect the two so as to disengage the high shaft coupling nut by rotation of the low shaft.

Other features and advantages will be apparent from the specification and claims and from the accompanying drawings which illustrate an embodiment of the invention.

BRIEF DESCRIPTION OF THE DRAWINGS

FIG. 1 is sectional view showing that portion of a gas turbine twin spool engine necessary to illustrate this invention.

FIG. 2 is view partly in elevation and partly in section illustrating the tool.

FIG. 3 is an enlarged end view of FIG. 2.

DESCRIPTION OF THE PREFERRED EMBODIMENT

In the context of this disclosure high and low refer to the standard terminology used in the gas turbine engine field and refers to the high pressure compressor and turbine and the low pressure compressor and turbine. Twin or dual spool refers to that class of engines that includes coaxially mounted shafts interconnecting the high pressure compressor with the high pressure turbine and the low pressure compressor with the low pressure turbine. Examples of such types of engines are the JT-3D, JT-8D and JT-9D manufactured by the Pratt and Whitney Division of United Technologies Corporation.

Reference is made to FIGS. 1 to 3 illustrating the details of this invention as including a tool 10 cylindrical in shape having internal splines 12 and external splines 14, which tool is adapted to fit into annular space 16 between the high turbine rotor hub 18 and low shaft 20. To gain access to annular space 16, the low turbine rotor 22 is first removed by unscrewing nut 23 threaded at the end of low shaft 20. Since this nut is accessible externally it provides no problem in the disassembly of this unit.

Once the low turbine rotor is removed, tool 10 is inserted into annular space 16 as shown in phantom and is sufficiently long to abut against nut lock 24 to move it axially out of engagement with the high rotor coupling nut 26. Nut lock 24 is spring loaded axially by spring 28 so that its face splines 30 engage complimentary face splines formed on coupling nut 26 to lock it in place and prevent inadvertent uncoupling. High rotor coupling nut 26 serves to couple high rotor hub 18 which is splined to the high shaft.

In accordance with this invention internal splines 34 are formed on the inner diameter of high rotor coupling nut 26 and external splines 36 are formed on the external diameter of low shaft 20 in proximity to but axially spaced from splines 34. Hence, external splines 14 and internal splines 12 on tool 10 are dimensioned to engage splines 34 and 36 respectively. Once the nut 26 and shaft 20 are torsionally coupled, the operator can apply a torquing tool to engage spline 38 to rotate shaft 20 to unscrew nut 26. With coupling threads 40 of nut 20 fully disengaged, turbine rotor 18 may be removed.

It should be understood that the invention is not limited to the particular embodiments shown and described herein, but that various changes and modifications may be made without departing from the spirit or scope of this novel concept as defined by the following claims.

We claim:

1. Tool means for removing a turbine from a twin spool gas turbine engine which has a pair of coaxially mounted shafts each having a turbine and a compressor mounted thereon, said shafts being spaced to form an annular groove, coupling means for securing each of said turbines to each of said shafts, said annular groove being accessible when said turbine on the inner of said shafts is decoupled, said tool means including retractable means adapted to be inserted in said annular groove to interconnect said inner shaft and the other of said coupling means for decoupling it to remove the turbine on the outer shaft.

2. Tool means as claimed in claim 1 wherein one of said turbines includes a turbine rotor hub extending into said annular groove and being splined to said outer shaft, and said other coupling means including an internal nut in said annular groove threaded to the end of said hub.

3. Tool means as claimed in claim 2 wherein said other coupling means further includes a nut lock splined internally of said outer shaft having a face spline, a complimentary face spline on the end of said internal nut engageable therewith, spring means urging said nut lock in engagement, said retractable means having an end face abutting said nut lock to urge it out of engagement.

4. Tool means as claimed in claim 3 wherein said inner shaft having an external spline formed in proximity to said internal nut, said internal nut having an internal spline, said retractable means having internal and external splines formed thereon engageable with said internal spline of said internal nut and said external spline of said inner shaft.

5. Retractable tool means for removing the high turbine of a gas turbine power plant having a high pressure compressor and turbine interconnected by a high shaft, a low pressure compressor and turbine interconnected by a low shaft coaxially mounted relative to said high shaft, coupling means for connecting the low turbine to the low shaft, and additional coupling means including a coupling nut internal of said high shaft, said coupling nut having internal splines, said low shaft having external splines disposed in proximity to but axially spaced from said internal splines, said retractable tool means fitted in an annular groove formed between said high and low shafts, and said retractable tool means having internal and external splines engaging said internal splines and said external splines, whereby the rotation of said low shaft decouples said high turbine.

6. Retractable tool means as claimed in claim 5 including a nut lock between said high and low shaft splined to said high shaft, said nut lock including face spline means complimenting face splines formed on the end of said coupling nut, spring means urging said face spline means in engagement, said retractable tool means including an end face portion abutting said nut lock to urge said face spline out of engagement.

7. The method of removing a high turbine from its shaft from a twin spool gas turbine engine having coaxial low and high shafts supporting a low turbine and compressor and a high turbine and compressor where the low turbine is ahead thereof so as to prevent access to said high turbine, and where said high turbine is secured to the high shaft by an internal nut mounted in an annular groove formed between said high and low coaxially mounted shafts, comprising the steps of removing the low turbine, inserting a tool engaging the low shaft and the internal nut and rotating the low shaft whereby the internal nut is decoupled and permits the high turbine to be removed.

8. The method as claimed in claim 7 wherein a nut lock is spring loaded against the internal nut comprising the step of concomitantly decoupling said nut lock from said internal nut in the step of inserting.

* * * * *